United States Patent [19]

Craig

[11] Patent Number: 4,966,939

[45] Date of Patent: Oct. 30, 1990

[54] POLYACRYLATE DISPERSIONS PREPARED WITH A WATER-SOLUBLE CONJUGATED UNSATURATED MONOMER IN THE ABSENCE OF A PROTECTIVE COLLOID

[75] Inventor: Daniel H. Craig, Hockessin, Del.

[73] Assignee: Hercules Incorporated, Wilmington, Del.

[21] Appl. No.: 884,822

[22] Filed: Jul. 11, 1986

[51] Int. Cl.$^5$ .............................................. C08L 37/00
[52] U.S. Cl. ................................... 524/811; 524/812; 524/815; 524/816; 524/817; 524/832; 524/833
[58] Field of Search ............... 524/811, 812, 817, 815, 524/832, 816, 833

[56] References Cited

U.S. PATENT DOCUMENTS

| | | | |
|---|---|---|---|
| 3,637,563 | 1/1972 | Christena | 260/29.6 R |
| 4,265,796 | 5/1981 | Mueller-Mall et al. | 260/29.6 R |
| 4,659,771 | 4/1987 | Craig | 524/700 |

FOREIGN PATENT DOCUMENTS

| | | | |
|---|---|---|---|
| 0074591 | 7/1978 | Japan . | |
| 0787703 | 12/1957 | United Kingdom | 524/832 |
| 1278813 | 6/1972 | United Kingdom . | |

*Primary Examiner*—Joseph L. Schofer
*Assistant Examiner*—J. M. Reddick
*Attorney, Agent, or Firm*—Joanne L. Horn; Mark D. Kuller

[57] ABSTRACT

Disclosed are aqueous polyacrylate dispersions having improved rheological and stability characteristics prepared by the emulsion polymerization of acrylic esters, methacrylic esters and mixtures thereof in the absence of a protective colloid, wherein the improvement comprises conducting the polymerization in the presence of, by weight of the total monomer content, from about 0.1 to 2% of at least one substantially completely water-soluble monomer having conjugated unsaturation. The resultant aqueous polyacrylate dispersions are useful in the manufacture of latex paints, binders for nonwoven materials, water-based inks, paper coatings and waterborne adhesives, such as pressure-sensitive adhesives.

23 Claims, No Drawings

POLYACRYLATE DISPERSIONS PREPARED WITH A WATER-SOLUBLE CONJUGATED UNSATURATED MONOMER IN THE ABSENCE OF A PROTECTIVE COLLOID

This invention relates to aqueous polyacrylate dispersions having improved rheological and stability characteristics and processes for their preparation. The aqueous polyacrylate dispersions are useful in the manufacture of latex paints, binders for nonwoven materials, water-based inks, paper coatings and water-borne adhesives, such as pressure-sensitive adhesives.

It is known that the presence of protective colloids, such as hydroxyethylcellulose (HEC) and polyvinyl alcohol, in the emulsion polymerization of acrylic esters, methacrylic esters or mixtures thereof together with above about 50% vinyl acetate, by weight of the total monomer, provides lattices having good mechanical stability and viscosity control. However, when the vinyl acetate comonomer is not used or is used in amounts less than 50%, a stable latex cannot be obtained if the protective colloid is present.

Further, it is known that the presence of protective colloids during the manufacture of polyacrylate dispersions or latices from reaction mixtures having a high acrylate or methacrylate content usually results either in coagulated dispersions or in extremely viscous dispersions which are unsuitable for use as paint binders or any other use.

Thus, it is not surprising that a number of methods have been developed to provide acrylic latices having the improved stability which results from the successful incorporation of protective colloids during the emulsion polymerization of acrylic or methacrylic monomers. For example, British Pat. No. 1,278,813 discloses the use of emulsion stabilizers, such as allyl alcohols, allyl halides and low molecular weight aliphatic alcohols; whereas U.S. Pat. No. 4,265,796 teaches the use of molecular weight regulators, such as mercaptoacetic acid and cyclohexylamine, to permit the inclusion of protective colloids in the manufacture of polyacrylate dispersions. In both instances the emulsion stabilizers and the molecular weight regulators disclosed in these patents appear to function as chain transfer agents since the chemical structures of both are related to traditional organo-soluble chain transfer agents The use of high levels of surfactants, e.g., about 5% to about 10%, based on the monomer, in place of the protective colloid has also been used to obviate the problems associated with the emulsion polymerization of acrylic esters and methacrylic esters in the presence of a protective colloid. However, the properties of the resultant latex, such as its film-forming ability, tensile strength, film-blocking resistance and water and solvent resistance are adversely affected.

This invention provides a method for producing mechanically stable acrylic ester and methacrylic ester latices without agglomeration which does not require the presence of emulsion stabilizers, molecular weight regulators, high surfactant levels or protective colloids during their preparation.

According to this invention, polyacrylate dispersions having improved mechanical stability are prepared by the emulsion polymerization of acrylic esters, methacrylic esters and mixtures thereof in the absence of a protective colloid, by conducting the polymerization in the presence of, by weight of the total monomer content, from about 0.1 to 2% of at least one substantially completely water-soluble monomer having conjugated unsaturation, as hereinafter defined. The resultant polyacrylate latices are low viscosity, shear stable, water-insoluble and reproducible and have good flow behavior, low grit levels, and a fine particle size. The total grit level (including coagulum) is about 1.0% to 2%, typically about 1%. The particle size is from 0.05 microns up to 0.5 microns, typically from 0.05 microns up to 0.3 microns. Latex paints formulated with these latices exhibit good abrasion resistance and improved gloss.

Acrylic esters and methacrylic esters suitable for use in the practice of this invention include alkyl acrylates and methacrylates wherein the alkyl group contains less than 10 carbon atoms. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, t-butyl acrylate, t-butyl methacrylate, 3,3-dimethylbutyl acrylate and 3,3-dimethyl butyl methacrylate. These monomers can be homopolymerized or copolymerized with each other.

In addition to being copolymerized with each other, the aforementioned acrylates and methacrylates can be copolymerized with one or more different monomers capable of addition type polymerization, including styrene, $C_{10-22}$ alkyl acrylates, $C_{10-22}$ alkyl methacrylates, acrylic or methacrylic acid, vinyl and vinylidene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids and the anhydrides, nitriles, unsubstituted and substituted (including N-substituted) amides of all said acids.

Suitable $C_{10-22}$ alkyl esters of acrylic and methacrylic acid include decyl acrylate, decyl methacrylate, hendecanyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl-lauryl methacrylate.

Suitable vinyl esters include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as, allyl acetate, allyl propionate and allyl lactate. Generally, these monomers are used in amounts ranging up to about 10% by weight of the total weight of monomers used. The allyl esters of saturated monocarboxylic acids are generally used in relatively small amounts together with larger amounts of one or more different vinyl monomers, particularly with aliphatic vinyl esters such as vinyl acetate.

Typical vinyl ethers include methylvinyl ether, ethylvinyl ether and n-butylvinyl ether and typical vinyl ketones include methylvinyl ketone, ethylvinyl ketone and iso-butylvinyl ketone. Suitable dialkyl esters of monoethylenically unsaturated dicarboxylic acids include diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecyl fumarate, dibutyl itaconate and dioctyl itaconate.

Monoethylenically unsaturated monocarboxylic acids, such as acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride are suitable for use as comonomers in the practice of this invention.

Acrylonitrile, alpha-chloro-acrylonitrile and methacrylonitrile are among the corresponding nitriles of such acids which can be used as comonomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Typical N-substituted amides include N-methylolacrylamide, N-methylolmethacrylamide, alkylated N-methylolacrylamides and N-methylolmethacrylamides, such as N-methoxymethylacrylamide and N-methoxymethylmethacrylamide.

Amino monomers which can be used in the practice of this invention include substituted and unsubstituted aminoalkyl acrylates, hydrochloride salts of amino monomers and methacrylates, such as beta-aminoethylacrylate, beta-aminoethylmethacrylate, dimethylaminomethylacrylate, beta-dimethylaminoethylacrylate, dimethylaminomethylmethacrylate. Typical hydroxy-containing monomers include beta-hydroxyethylacrylate, beta-hydroxypropylacrylate, gamma-hydroxypropylacrylate and beta-hydroxyethylmethacrylate.

Typically, the comonomer is present in an amount from about 0.5% to less than 50%, by weight of the total monomer content, preferably from about 0.5% to about 25%, most preferably from about 1% to about 10%.

The substantially completely water-soluble monomers having conjugated unsaturation, i.e., conjugated double or triple bonds, suitable for use in the practice of this invention include furoic acid, styrene sulfonic acid, the metal salts, amine salts, ammonium salts and quaternary salts of rosin and of acids having $C_4$ to $C_{36}$ carbon atoms, preferably $C_4$ to $C_{24}$ carbon atoms, and the water-soluble derivatives thereof. Suitable substantially completely water-soluble monomers having conjugated unsaturation include the water-soluble amine salts, amides, substituted amides, hydroxyalkyl esters and sulfoalkyl esters of sorbic acid, cinnamic acid, abietic acid, furoic acid, styrene sulfonic acid, linoleic acid, furylacrylic acid and muconic acid.

The term "substantially completely water-soluble" as use herein means a monomer having conjugated unsaturation which has a solubility of at least 0.4 grams per 100 ml of water at room temperature (about 20° C.), preferable 1.0 grams per 100 ml of water.

Suitable metals for forming the metal salts include sodium, potassium, lithium, magnesium, calcium and zinc.

Only substantially completely water-soluble monomers possessing conjugated unsaturation are useful in the practice of this invention. Water-insoluble conjugated monomers, such as hexadiene, butadiene, isoprene, sorbic acid, cinnamic acid, abietic acid, vinyl benzoic acid, linoleic and muconic acid provide coagulated dispersions or dispersions possessing little, if any, mechanical stability.

Although the amount of water-soluble monomers having conjugated unsaturation used will vary depending on the desired viscosity, particle size and latex properties, generally from about 0.1 to about 2%, by weight of the total monomer content, is employed, preferably from about 0.5% to about 1%.

These conjugated monomers are readily copolymerizable with acrylic esters and methacrylic esters. The resultant polyacrylate dispersions impart significant improvement to wet-abrasion resistance of latex paints formulates with them.

Anionic, cationic, nonionic and amphoteric emulsifiers and mixtures thereof known in the art may be used in the practice of this invention.

Suitable emulsifiers include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-12}$ alkyl phenols and their sulfonation products and also sulfosuccinic acid esters in amounts usually of from 0.1 to 5.0% by weight based on the monomers.

Any known methods of emulsion polymerization may be used, including batch, semi-batch, continuous or redox techniques. Semi-batch monomer addition, other than the water-soluble conjugated monomer, with either batch or continuous addition of the initiator concomitant with the delayed addition of monomer, other than the water-soluble conjugated unsaturated monomer, is preferred. Preferably from about 1% to about 50% of the monomer or monomers, other than the water-soluble conjugated monomer, is added in the initial charge to the reactor, most preferably about 8% to about 35%. The continuous addition of any reaction ingredient or ingredients is generally done over a period of from about 2 to about 4 hours. The delayed addition of protective colloid or the water-soluble conjugated monomer along with either batch or delayed initiator addition may be used, although these variations are not necessary for the success of this invention. Indeed, the inclusion of the conjugated monomers in the initial reactor charge is sufficient for the success of this invention, regardless of the method of addition of the rest of the reaction components.

In general, the monomers are polymerized in aqueous emulsion at from about 45° C. to about 95° C. in the presence of a free radical polymerization initiator, particularly a water-soluble peroxide, e.g., hydrogen peroxide, persulfates such as potassium, sodium and ammonium persulfates or in some cases perborates. Other methods known in the art may also be used to polymerize acrylic monomers, such as redoxcatalysts.

All parts and percentages used in this specification are by weight unless otherwise indicated.

The following examples are illustrative of this invention.

EXAMPLE 1

This example illustrates one embodiment of the aqueous polyacrylate dispersions of this invention and how to prepare same.

A reaction vessel equipped with a stirrer, reflux condenser, thermometer, one feed port and a water jacket is charged with 52.35 parts distilled water, 1 part octylphenol ethoxylate having 10 moles of ethylene oxide, 0.15 parts sodium dodecyl benzene sulfonate, 0.5 parts potassium sorbate, and 10 parts of a monomer mixture containing, by weight, 42.7 parts butyl acrylate, 56.8 parts methyl methacrylate, and 0.5 parts methacrylic acid. Stirring is continuous throughout the reaction. The temperature of the reactor is raised to 85° C. via circulating hot water, 1.0 parts of a 5% aqueous solution of potassium persulfate is added batchwise and the addition of 34 parts of the above monomer mixture is started and continued uniformly over 2.5 hours. After one-half of the total monomer feed has been added, 1.0 parts of a 5% aqueous solution of potassium persulfate is added batchwise. The reaction temperature is maintained at 85° C. for 2 hours after the addition of the monomer feed. The reaction mixture is then cooled by circulating cold water.

EXAMPLE 2

This example illustrates another embodiment of this invention.

The procedure and formulation of Example 1 are used except potassium cinnamate is used instead of potassium sorbate.

EXAMPLE 3

This example illustrates another embodiment of this invention.

A reaction vessel equipped with a stirrer, reflux condenser, thermometer, one feed port and a water jacket is charged with 42.35 parts distilled water, 1 part octylphenol ethoxylate having 10 moles of ethylene oxide, 0.15 parts sodium dodecyl benzene sulfonate, 0.5 parts potassium sorbate. Stirring is continuous throughout the reaction. The temperature of the reactor is raised to 85° C. via circulating hot water. The addition of (1) 4.0 parts of a 5% aqueous solution of potassium persulfate and 8.0 parts distilled water and of (2) 44 parts of a monomer mixture containing, by weight, 42.7 parts butyl acrylate, 56.8 parts methyl methacrylate, and 0.5 parts methacrylic acid, are added in delay fashion using two separate feed streams over 2.5 hours. The rates of addition of the two feed streams are adjusted so that the addition of the potassium persulfate and water feed stream is completed 10 minutes before the addition of the monomer mixture feed stream. The reaction temperature is maintained at 85° C. for 2 hours after the additions are complete. The reaction mixture is then cooled by circulating cold water.

COMPARATIVE EXAMPLE 4

This example illustrates the preparation of aqueous polyacrylate dispersions in the presence of a water-insoluble conjugated unsaturated monomer.

The procedure and formulation of Example 1 are used except that sorbic acid is used instead of potassium sorbate.

COMPARATIVE EXAMPLE 5

This example, illustrates the preparation of aqueous polyacrylate dispersions in the presence of a water-insoluble conjugated unsaturated monomer.

The procedure and formulation of Example 1 are used except that cinnamic acid is used instead of potassium sorbate.

COMPARATIVE EXAMPLE 6

This example illustrates the preparation of aqueous polyacrylate dispersions in the absence of a substantially completely water-soluble conjugated unsaturated monomer.

The procedure and formulation of Example 1 are used except that 0.5 parts potassium sorbate is omitted.

COMPARATIVE EXAMPLE 7

This example illustrates another preparation of aqueous polyacrylate dispersions in the absence of a substantially completely water-soluble conjugated unsaturated monomer.

The procedure and formulation of Example 3 are used except that 0.5 parts potassium sorbate is omitted.

The properties of the aqueous polyacrylate dispersions of Examples 1–3 and of Comparative Examples 4–7 are set forth in Table I.

TABLE I

| Example | pH | Solids, Wt. % | Viscosity, cps[1] | Particle Size, microns[2] | Shear Stability[3] |
|---|---|---|---|---|---|
| 1 | 6.4 | 44 | 6 | 0.29 | Yes |
| 2 | 6.4 | 38 | 4 | 0.22 | Yes |
| 3 | 5.8 | 46 | 4 | 0.36 | Yes |
| 4 | 2.8 | 46 | 37 | 0.11 | No[4] |
| 5 | 2.8 | 46 | 30 | 0.11 | No[4] |
| 6 | 2.8 | 46 | 32 | 0.12 | No[4] |
| 7 | 2.7 | 48 | 25 | 0.11 | No[4] |

[1]Brookfield LVT viscosity at 25° C. before shearing the sample in a Waring blender for 5 minutes at the highest speed.
[2]Coulter Nanosizer particle size reading before shearing the sample in a Waring blender for 5 minutes at the highest speed.
[3]Five minutes in a Waring blender at highest speed.
[4]Five seconds to failure.

EXAMPLE 8

The example illustrates the use of the polyacrylate latices of this invention in flat latex paint formulations and how to prepare them.

The latex paint is prepared by charging a Cowles disperser with the first 13 ingredients set forth below in Table II and mixing and grinding at high speed for 20 minutes. The remaining 3 ingredients of Table II are then added to the disperser and the mixture is mixed at medium speed for 20 minutes.

TABLE II

| Ingredients | Parts by Weight |
|---|---|
| Distilled water | 444.5 |
| Potassium tripolyphosphate | 2.0 |
| Lecithin | 2.0 |
| Aqueous diisobutylene-maleic acid copolymer, Na salt (25% solids) | 5.0 |
| Defoamer 501 hydrophobic surface-modified silica** | 2.0 |
| Ethylene glycol | 20.0 |
| Diethylene glycol monobutyl ether acetate | 10.0 |
| Titanium dioxide, paint grade | 175.0 |
| Calcium carbonate | 150.0 |
| Iceberg clay | 125.0 |
| Silica, 3 microns average particle size; 99.5% $SiO_2$ | 25.0 |
| Nonylphenoxy polyethyleneoxyethanol (10) | 3.0 |
| Hydroxyethyl cellulose having a 2.5 M.S. | 5.5 |
| Bromobenzylacetate | 0.5 |
| Latex of Example 1* | 94.0 |
| Distilled water | 56.0 |

*Based on 48% solids latex. The amount of wet latex and water added during the let-down stage will vary according to the weight percent latex solids. All latexes are formulated to 45 g dry latex solids.
**Available from Hercules Incorporated.

EXAMPLES 9–10 AND COMPARATIVE EXAMPLES 11–14

Examples 9–10 illustrate other embodiments of this invention.

The procedure and formulation of Example 8 are used except that the latexes of Examples 2, 3, and Comparative Examples 4, 5, 6 and 7, respectively, are used in Examples 9-10 and Comparative Examples 11-14 instead of the latex of Example 1.

The properties of the latex formulations of Examples 8-10 and Comparative Examples 11-14 are set forth in Table III below:

TABLE III

| Example | Abrasion Resistance[1], Cycles to Failure |
|---|---|
| 8 | 80 |
| 9 | 70 |
| 10 | 72 |
| 11 | 50 |
| 12 | 45 |
| 13 | 45 |
| 14 | 49 |

[1]Represents scrub cycles to failure of 78 PVC flat paint films after 4 days aging formulated with the respective latex according to ASTM D-2486-74a.

Thus this invention provides low viscosity and shear stable acrylic latices having good flow behavior and low grit which can be formulated into latex paints having good abrasion resistance.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim is:

1. A process for preparing an acrylic polymer latex by the aqueous emulsion polymerization of an acrylic ester, a methacrylic ester or mixtures thereof, in the absence of a protective colloid and in the presence of a polymerization initiator, wherein the polymerization is conducted in the presence of from about 0.1% to 2%, by weight of the total monomer, of a substantially completely water-soluble conjugated unsaturated monomer having a solubility of at least 0.4 gram per 100 ml of water at about 20° C. selected from the group consisting of furoic acid, metal salts, amine salts, ammonium salts and quaternary salts of rosin and of $C_5$ to $C_{36}$ carboxylic acids, and water-soluble derivatives thereof.

2. A process for preparing an acrylic polymer latex by the aqueous emulsion polymerization of an acrylic ester, a methacrylic ester of mixtures thereof, in the absence of a protective colloid and in the presence of a polymerization initiator, wherein the polymerization is conducted in the presence of from about 0.1% to 2%, by weight of the total monomer, of a substantially completely water-soluble conjugated unsaturated monomer having a solubility of at least 0.4 gram per 100 ml of water at about 20° C. is selected from the group consisting of the water-soluble amine salts, amides, substituted amides, hydroxyalkyl esters and sulfoalkyl esters of sorbic acid, cinnamic acid, abietic acid, furoic acid, linoleic acid, furylacrylic acid and muconic acid.

3. The process of claim 1 wherein the acrylic ester is an alkyl acrylate wherein the alkyl group contains less than 10 carbon atoms.

4. The process of claim 1 wherein the methacrylic ester is an alkyl methacrylate wherein the alkyl group contains less than 10 carbon atoms.

5. The process of claim 1 wherein (i) all of the substantially completely water-soluble conjugated unsaturated monomer, (ii) from about 1% to about 50% of the remaining monomer mixture and (iii) one-half of the polymerization initiator is added in an initial reaction charge, the rest of the remaining monomer mixture is then added continuously over a period from about 2 to about 4 hours, and the remaining half of the polymerization initiator is added and the reaction continued until polymerization is complete 6. The process of claim 5 wherein from about 8% to about 35% of the remaining monomer mixture is added in the initial reaction charge.

7. The process of claim 1 wherein (i) all of the substantially completely water-soluble conjugated unsaturated monomer and (ii) from about 1% to about 50% of the remaining monomer mixture is added in an initial reaction charge, the polymerization initiator and the rest of the remaining monomer mixture is then added continuously over a period from about 2 to about 4 hours in delay fashion such that the addition of the polymerization initiator is completed about 10 minutes before the addition of the rest of the monomer mixture is complete, and the reaction continued until polymerization is complete.

8. The process of claim 7 wherein from about 8% to about 35% of the remaining monomer mixture is added in the initial reaction charge.

9. The product produced by the process of claim 1.
10. The product produced by the process of claim 2.
11. The product produced by the process of claim 5.
12. The product produced by the process of claim 7.
13. The process of claim 1 wherein the substantially completely water-soluble conjugated unsaturated monomer is selected from the group consisting of the metal salts, amine salts, ammonium salts and quaternary salts of rosin and of $C_5$ to $C_{36}$ carboxylic acids.

14. The process of claim 1 wherein the substantially completely water-soluble conjugated unsaturated monomer is selected from the group consisting of the metal salts of rosin and of $C_5$ to $C_{36}$ carboxylic acids.

15. The process of claim 1 wherein the metal for forming the metal salts is selected from the group consisting of sodium, potassium, lithium, magnesium, calcium and zinc.

16. The process of claim 3 wherein the methacrylic ester is an alkyl methacrylate wherein the alkyl group contains less than 10 carbon atoms.

17. The process of claim 1 wherein the substantially completely water-soluble conjugated unsaturated monomer has a solubility of at least 1.0 grams per 100 ml of water at about 20° C.

18. The product produced by the process of claim 15.
19. The product produced by the process of claim 17.
20. The process of claim 1 wherein the polymerization is carried out in the presence of 0.1 to 5.0%, by weight of the total monomer, of an emulsifier selected from the group consisting of anionic cationic, nonionic and amphoteric emulsifiers and mixtures thereof and the substantially completely water-soluble conjugated unsaturated monomer has 5 to 24 carbon atoms.

21. The process of claim 13 wherein the polymerization is carried out in the presence of 0.1 to 5.0% by weight of the total monomer, of an emulsifier selected from the group consisting of anionic, cationic, nonionic and amphoteric emulsifiers and mixtures thereof and the substantially completely water-soluble conjugated unsaturated monomer has 5 to 24 carbon atoms.

22. The process of claim 1 wherein the acrylic ester, a methacrylic ester or mixtures thereof are copolymerized with about 0.5 to less than 50%, by weight of the total monomers, of one or more different comonomers capable of addition polymerization.

23. The process of claim 16 wherein the acrylic ester, a methacrylic ester of mixtures thereof are copolymerized with about 1 to less than 10%, by weight of the total monomers, of one ore more different comonomers capable of addition polymerization.

* * * * *

UNITED STATES PATENT AND TRADEMARK OFFICE
CERTIFICATE OF CORRECTION

PATENT NO. : 4,966,939

DATED : October 30, 1990

INVENTOR(S) : D.H. Graig

It is certified that error appears in the above-identified patent and that said Letters Patent is hereby corrected as shown below:

Column 1, Line 19

"lattices" should read -- latices --

Column 1, Line 47

"agents" should read -- agents. --

Column 4, Line 10

"to wet-abrasion" should read -- to the wet abrasion --

Column 4, Line 11

"formulates" should read -- formulated --

UNITED STATES PATENT AND TRADEMARK OFFICE
CERTIFICATE OF CORRECTION

PATENT NO. : 4,966,939

DATED : October 30, 1990

INVENTOR(S) : D. H. Graig

It is certified that error appears in the above-identified patent and that said Letters Patent is hereby corrected as shown below:

Column 4, Line 52

"redoxcatalysts." should read -- redox catalysts. --

Column 7, Line 51

"ester of" should read -- ester or --

Column 8, Line 10

"complete" should read -- complete. --

Column 10, Line 4

"ore" should read -- or --

Signed and Sealed this

Fourth Day of June, 1991

Attest:

HARRY F. MANBECK, JR.

Attesting Officer

Commissioner of Patents and Trademarks